United States Patent
Deshpande et al.

(10) Patent No.: US 11,775,399 B1
(45) Date of Patent: Oct. 3, 2023

(54) EFFICIENT RECOVERY IN CONTINUOUS DATA PROTECTION ENVIRONMENTS

(71) Applicant: INTERNATIONAL BUSINESS MACHINES CORPORATION, Armonk, NY (US)

(72) Inventors: Umesh Deshpande, San Jose, CA (US); Nicholas Linck, Grand Rapids, MI (US); Sangeetha Seshadri, Plano, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/656,687

(22) Filed: Mar. 28, 2022

(51) Int. Cl.
 *G06F 11/14* (2006.01)
(52) U.S. Cl.
 CPC ...... *G06F 11/1469* (2013.01); *G06F 2201/84* (2013.01)
(58) Field of Classification Search
 CPC ................... G06F 11/1469; G06F 2201/84
 See application file for complete search history.

(56) References Cited

U.S. PATENT DOCUMENTS

| | | | | |
|---|---|---|---|---|
| 6,016,553 A * | 1/2000 | Schneider | ........... | G06F 11/1471 714/21 |
| 6,341,345 B1 * | 1/2002 | Auslander | ............. | G06F 9/3824 712/E9.046 |
| 7,305,421 B2 | 12/2007 | Cha | | |
| 7,603,395 B1 | 10/2009 | Bingham | | |
| 7,877,360 B2 * | 1/2011 | Rohit | .................. | G06F 11/1471 707/648 |
| 7,971,091 B1 | 6/2011 | Bingham | | |
| 8,291,170 B1 | 10/2012 | Zhang | | |
| 8,332,689 B2 | 12/2012 | Timashev | | |
| 8,452,735 B2 | 5/2013 | Mandagere | | |
| 8,600,952 B2 | 12/2013 | Blitzer | | |

(Continued)

OTHER PUBLICATIONS

Disclosed Anonymously, "Recovery Advisor for Log-Structured Storage," IP.com, IP.com No. PCOM000263188D, IP.com Publication Date: Aug. 4, 2020, 4 pages.

(Continued)

*Primary Examiner* — Merilyn P Nguyen
(74) *Attorney, Agent, or Firm* — David Spalding

(57) ABSTRACT

A computer-implemented method, a computer system and a computer program product efficiently select restore points in a continuous data protection environment. The method includes receiving log entries that include restore points that correspond to data stored on nodes in the continuous data protection environment. The method also includes identifying an interesting restore point from the log entries. The method further includes grouping the interesting restore point for recovery based on one or more of a confidence score and a restore time. In addition, the method includes loading the group of interesting restore points on available nodes in the continuous data protection environment. The method also includes determining whether the data corresponding to each interesting restore point in the group is valid using a validation function. Lastly, the method includes discarding the interesting restore point when the data corresponding to the interesting restore point is not valid.

20 Claims, 4 Drawing Sheets

(56) References Cited

U.S. PATENT DOCUMENTS

| | | | |
|---|---|---|---|
| 8,712,970 | B1 | 4/2014 | Sim-Tang |
| 9,092,475 | B2 | 7/2015 | Schreter |
| 9,495,370 | B1 | 11/2016 | Chatterjee |
| 9,632,875 | B2 | 4/2017 | Raichstein |
| 10,567,500 | B1* | 2/2020 | Leshinsky .......... H04L 67/1097 |
| 10,877,851 | B2 | 12/2020 | Mitkar |
| 11,138,156 | B2* | 10/2021 | Byun ..................... G06F 11/14 |
| 11,520,907 | B1* | 12/2022 | Borowiec ............... G06F 3/067 |
| 2011/0296237 | A1* | 12/2011 | Mandagere .......... G06F 11/079 |
| | | | 714/E11.029 |
| 2014/0143207 | A1* | 5/2014 | Brewer .................. G06F 16/22 |
| | | | 707/634 |
| 2020/0242078 | A1* | 7/2020 | Dain .................... G06F 16/906 |
| 2021/0216666 | A1* | 7/2021 | Miller .................. G06F 3/0604 |
| 2021/0255938 | A1* | 8/2021 | Baker ................ G06F 11/1469 |
| 2022/0092180 | A1* | 3/2022 | Richardson ............. G06F 21/64 |
| 2022/0365821 | A1* | 11/2022 | Darji ....................... G06F 21/64 |
| 2023/0132591 | A1* | 5/2023 | Karr .................... G06F 11/1461 |
| | | | 711/162 |

OTHER PUBLICATIONS

Li et al., "Efficient Metadata Management in Block-Level CDP System for Cyber Security," IEEE Access, vol. 7, 2019, Published Oct. 17, 2019, https://ieeexplore.ieee.org/stamp/stamp.jsp?tp=&arnumber=8873642, pp. 151569-151578.

Mell et al., "The NIST Definition of Cloud Computing", National Institute of Standards and Technology, Special Publication 800-145, Sep. 2011, pp. 1-7.

Verma et al., "SWEEPER: An Efficient Disaster Recovery Point Identification Mechanism," USENIX Association, FAST '08: 6th USENIX Conference on File and Storage Technologies, pp. 297-312.

Yang et al., "ST-CDP: Snapshots in TRAP for Continuous Data Protection," IEEE, IEEE Transactions On Computers, vol. 61, No. 6, Jun. 2012, pp. 753-766.

* cited by examiner

EFFICIENT RECOVERY IN CONTINUOUS DATA PROTECTION ENVIRONMENTS

BACKGROUND

Embodiments of the invention relate to the field of data storage, and, in particular, to reducing recovery time in a log-based storage system through efficient restore point selection.

Business critical enterprise applications may be loaded and executed on data storage systems that may implement continuous data protection (CDP), which may refer to a system that backs up data on a computer system every time a change is made. A CDP system may maintain a continuous log of data changes, or restore points, to make it possible to restore a system to any previous point in time. The large size of the log may place a premium on efficiently selecting restore points from the log to quickly recover the data storage system in the event of catastrophic data loss.

SUMMARY

An embodiment is directed to a computer-implemented method for efficiently selecting restore points in a continuous data protection environment. The method may include receiving a plurality of log entries from the continuous data protection environment, where the log entries include a plurality of restore points that correspond to data stored on nodes in the continuous data protection environment. The method may also include identifying interesting restore points from the log entries, where each interesting restore point occurs at a time prior to I/O activity that is determined to be unusual. Each interesting restore point is also associated with a confidence score. The method may further include grouping the interesting restore points for recovery scheduling based on one or more of the confidence score and a restore time. In addition, the method may include loading the group of interesting restore points on a plurality of available nodes in the continuous data protection environment. The method may also include determining whether the data corresponding to each interesting restore point in the group is valid using a validation function on each available node. Lastly, the method may include discarding the interesting restore point when the data corresponding to the interesting restore point is not valid.

In another embodiment, the method may include modifying the confidence score associated with the interesting restore point when the data corresponding to the interesting restore point is not valid.

In a further embodiment, the method may include loading the data corresponding to the interesting restore point into the nodes of the continuous data protection environment when the data corresponding to the interesting restore point is valid.

In yet another embodiment, the method may include labeling the interesting restore point in the log entries of the continuous data protection environment when the data corresponding to the interesting restore point is valid.

In an embodiment, a machine learning model that predicts the usefulness of data corresponding to a restore point based on a proximity in time prior to unusual I/O activity may be used to identify the interesting restore point from the log entries.

In a further embodiment, the restore time may be determined by comparing a predicted load time, wherein the load time indicates a time to load the data corresponding to the interesting restore point on a subject node, and a predicted replay time, wherein the replay time indicates a time to load a difference between data that is currently loaded on the subject node and the data corresponding to the interesting restore point.

In an additional embodiment, each interesting restore point in the group may be loaded on a distinct available node.

In addition to a computer-implemented method, additional embodiments are directed to a computer system and a computer program product for efficiently selecting restore points in a continuous data protection environment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
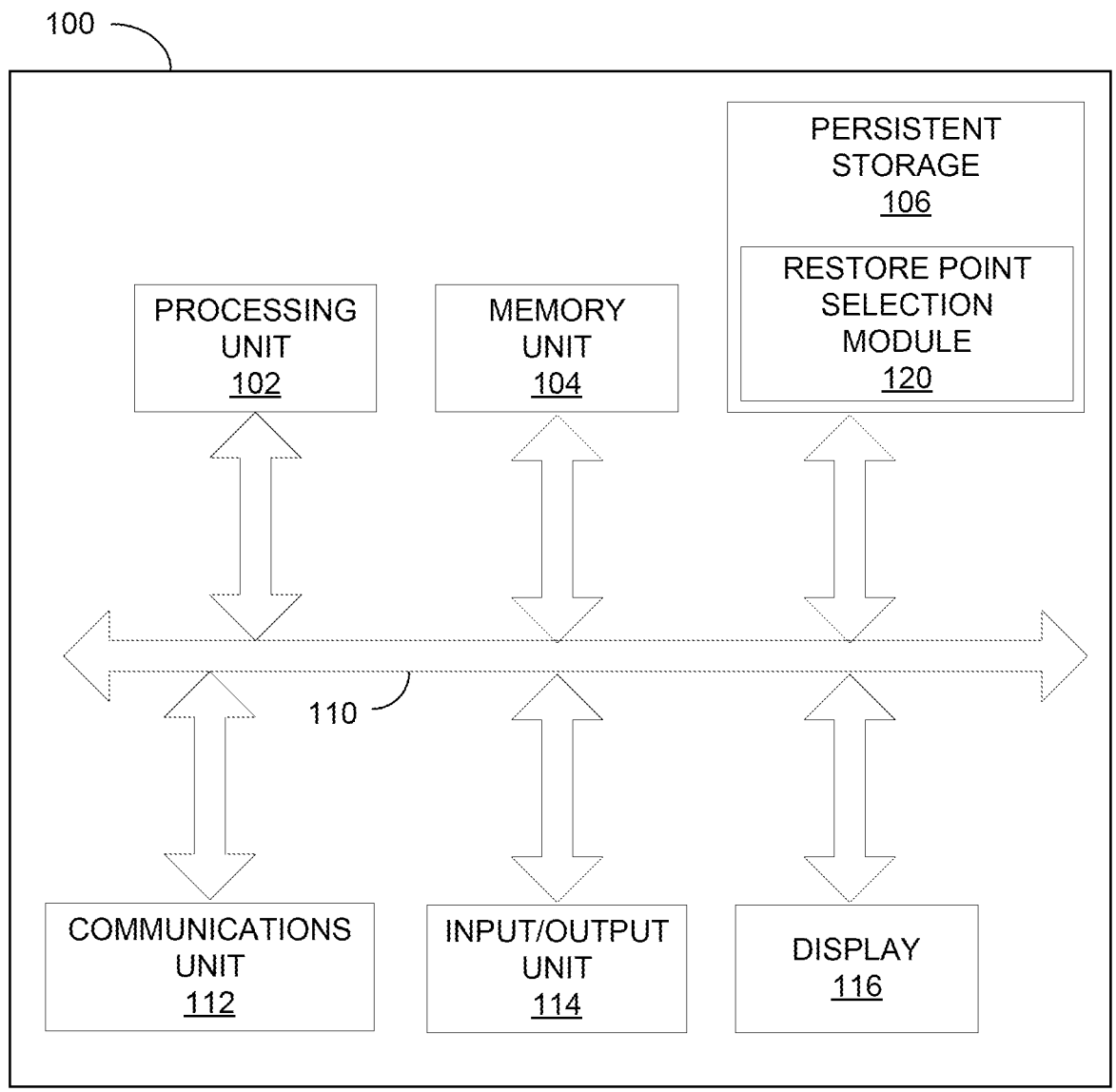
FIG. 1 depicts a block diagram of an example computer system in which various embodiments may be implemented.

Business critical enterprise applications may suffer data loss and downtime from event failures encountered by a system associated with such applications, which may result from data corruption, or the data becoming incorrect, deleted, or unreadable. The data corruption may, in turn, be caused by human configuration errors, physical media errors, storage controller failures, firmware errors, logical software bugs, virus attacks, or malicious software.

One scheme to mitigate disruptions from these dangers is known as a continuous data protection (CDP) environment, where point-in-time copies of data, or copies of the state of a storage device at a given point-in-time, may be taken in the form of snapshots. For example, storage systems may take periodic (e.g., every half-hour) snapshots of the data stored on the storage system. These point-in-time copies of data may be used to restore data, and therefore may also be known as restore points, when a primary copy of data on the storage device may be lost or corrupted. A restore point for a data volume may be a logical copy of the data volume, also referred to as a snapshot, when only the changed data blocks are maintained. A point-in-time copy of a data volume may also be a physical copy of the data volume, also referred to as a clone in this instance, when a complete copy of the data volume is created on the same or a different set of physical disks.

Restore points mat be used for backing up high-availability systems for the purpose of enabling efficient system and data recovery. A restore point may be used to revert back to data at a previous satisfactory state to resolve a data error in the primary copy of data. It may be common, for instance, for system administrators to try the most recent restore point for a data restore and proceed manually one by one until a non-corrupt copy of the data may be found. In this process, each successive restore point may be tested for consistency to determine whether the data within the restore point may be corrupt.

This repeated manual mounting and testing of each restore point until a valid restore point is found, along with the need to potentially review event logs to determine a root-cause of data corruption and then manually select a restore point for recovery based on the root-cause, may place a premium on efficiently selecting restore points from recovery in order to reduce overall recovery time. The size of the event logs and the large number of available restore points may also contribute to the difficulty of selecting appropriate restore points and increase recovery time.

Therefore, it may be advantageous to provide a method of reducing the recovery time in such an event-based log structured continuous data protection (CDP) environment. When recovering to a specific version of data, or restore point, system administrators may attempt to recover to a point in time prior to a certain event as quickly as possible. However, in the log structured CDP environment, due to the multitude of possible recovery points, it may be challenging for the CDP environment to offer low recovery time. As an example, if 1 entry per second were logged, one day's worth of data results in as many as 86,000 possible recovery points. In such an environment, using parallel recovery may allow a system administrator to simultaneously validate several restore points, but all restore points cannot be recovered in parallel. Therefore, it may be useful to parallelize recovery and also narrow down a search to a region of interest and schedule the recovery on the available nodes to leverage the prior loaded recovery points. Such a method may improve the efficiency of selecting restore points for the purpose of recovering data and also yield faster recovery times to minimize disruptions from data loss or corruption in continuous data protection environments.

Referring now to FIG. 1, there is shown a block diagram illustrating a computer system 100 in accordance with an embodiment. It should be appreciated that FIG. 1 provides only an illustration of one implementation and does not imply any limitations with regard to the environments in which different embodiments may be implemented. Many modifications to the depicted environments may be made based on design and implementation requirements. For example, computer system 100 may be implemented in hardware only, software only, or a combination of both hardware and software. Computer system 100 may have more or fewer components and modules than shown, may combine two or more of the components, or may have a different configuration or arrangement of the components. Computer system 100 may include any additional component enabling it to function as an operable computer system, such as a motherboard, data busses, power supply, a network interface card, a display, an input device (e.g., keyboard, pointing device, touch-sensitive display), etc. (not shown). Moreover, components of computer system 100 may be co-located or distributed, or the system could run as one or more cloud computing "instances," "containers," and/or "virtual machines," as known in the art.

As shown, a computer system 100 includes a processor unit 102, a memory unit 104, a persistent storage 106, a communications unit 112, an input/output unit 114, a display 116, and a system bus 110. Computer programs such as restore point selection module 120 may be stored in the persistent storage 106 until they are needed for execution, at which time the programs are brought into the memory unit 104 so that they can be directly accessed by the processor unit 102. The processor unit 102 selects a part of memory unit 104 to read and/or write by using an address that the processor unit 102 gives to memory unit 104 along with a request to read and/or write. Usually, the reading and interpretation of an encoded instruction at an address causes the processor unit 102 to fetch a subsequent instruction, either at a subsequent address or some other address. The processor unit 102, memory unit 104, persistent storage 106, communications unit 112, input/output unit 114, and display 116 all interface with each other through the system bus 110.

Examples of computing systems, environments, and/or configurations that may be represented by the computer system 100 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Each computing system 100 may also include a communications unit 112 such as TCP/IP adapter cards, wireless Wi-Fi interface cards, or 3G or 4G wireless interface cards or other wired or wireless communication links. Communication between mobile devices may be accomplished via a network and respective network adapters or communication units 112. In such an instance, the communication network may be any type of network configured to provide for data or any other type of electronic communication. For example, the network may include a local area network (LAN), a wide area network (WAN), a virtual private network (VPN), a mobile or cellular telephone network, the Internet, or any other electronic communication system. The network may use a communication protocol, such as the Transmission Control Protocol (TCP), the User Datagram Protocol (UDP), the Internet Protocol (IP), the Real-time Transport Protocol (RTP), the Hyper Text Transport Protocol (HTTP), or a combination thereof.

The computer system 100, through restore point selection module 120, may be used within a continuous data protection environment for efficiently selecting restore points for the purpose of recovering data to the nodes of the continuous data protection environment in the event of data corruption or other catastrophic loss of data in the environment. A restore point, as the term is used herein, may consist of a time stamp in the environment log and correspond to data that may be stored on one or more nodes of the continuous data protection system such that the restore point may represent a snapshot of the data at the corresponding date and time. Therefore, while the selection of restore points may occur within the log and involve analysis of time and date, completion of the process may include loading of the data that corresponds to the restore point into one or more nodes of the continuous data protection environment to validate that the data is free of corruption or other defects.

Figure 2:
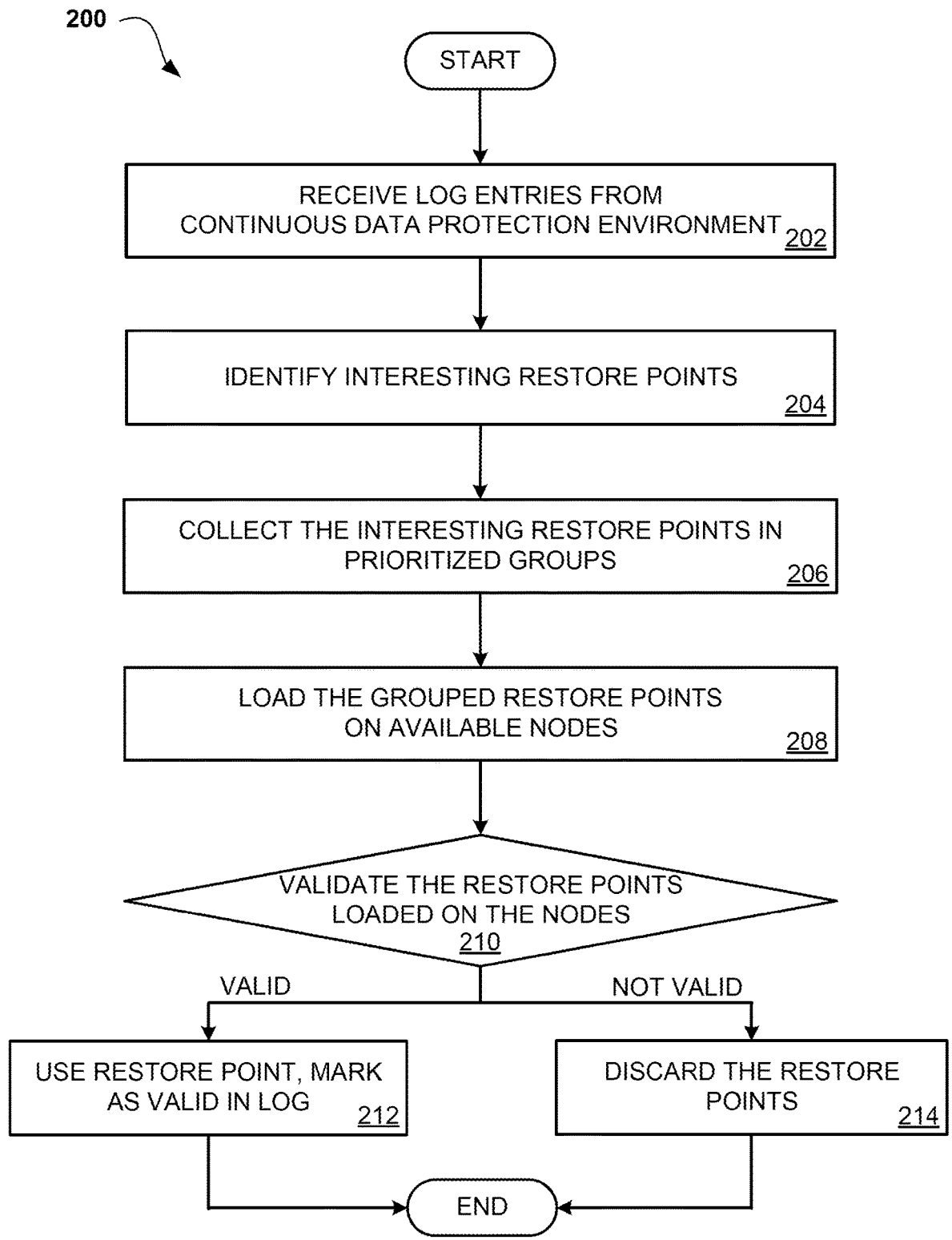
FIG. 2 depicts a flow chart diagram of a process for efficiently selecting restore points in a continuous data protection environment in accordance with one or more embodiments.

Referring to FIG. 2, an operational flowchart illustrating a process 200 for efficiently selecting restore points in a continuous data protection environment is depicted according to at least one embodiment. At 202, log entries of the continuous data protection system may be received by the restore point selection module 120. The log entries may contain restore points of the continuous data protection system, which, as described with respect to FIG. 1, may consist of a time stamp and correspond to data that may be stored on one or more nodes of the continuous data protection system such that the restore point may represent a snapshot of the data at the corresponding date and time. For example, recovering a restore point of "Tuesday, April 5 at 9:12:24 PM" may load the data as it existed at 9:12:24 PM on Tuesday, April 5. As noted with respect to FIG. 1, the log entries may all be time-based but the restore points may provide a mapping of the time to actual data stored on the nodes of the continuous data protection system.

At 204, interesting restore points may be identified by locating specific "regions of interest" in the log entries of the continuous data protection system, which may be a pre-defined time window prior to an interesting event such as unusual I/O (input/output) activities or a system event, and then collecting restore points in the "region of interest". In this context, unusual I/O activity or system events may include events in the logs when certain parameters are out of normal range, e.g., significantly higher or lower than pre-determined thresholds, in a given time window. Examples of the parameters include I/O rate (read/write), bandwidth, age of the data modified and fraction of data updated. Detection of these parameters may occur within a time window, e.g., over 15 mins or over a few hours, or may be at a static time in the log. If the parameter is monitored over a time window, then significant deviation in the time-window may suggest unusual I/O activity. It should be noted that the normal range of these parameters may vary from application to application. The process of identification may include associating restore points with a confidence score that may measure how likely the restore point may represent the desired version of data. As an example of this process, if a continuous data protection system is subject to a ransomware attack, then it may be desirable to return to the version of data on the affected system that was present immediately prior to the attack. In this case, the CDP system may check its logs and identify a pre-defined time window before the attack, e.g., a "region of interest". All restore points within this window may be identified and it may be predicted whether the restore point represents the data that existed immediately prior to the attack. This prediction may be done by looking at time stamps to see which is the closest to the time of the attack or may use other factors, such as potential anomalous behavior prior to the attack that may indicate that data between the time of the anomalous behavior and attack is likely to be corrupt. The restore points may individually be associated with a confidence score, indicating confidence in the prediction, which may allow the restore points to be ranked for the next step in the process.

In an embodiment, a supervised machine learning classification model may be trained to predict the usefulness of data corresponding to a restore point. Usefulness of data may be defined as proximity in time to a system event or other unusual activity, as mentioned above. For instance, if the environment is recovering from a ransomware attack, it may be helpful to begin a search in a time window immediately prior to the attack. In another example, it may be useful to look at a time window near a regular maintenance backup because a controlled backup may be more comprehensive than an ad-hoc time in the log and the data may be more useful or trustworthy.

One or more of the following machine learning algorithms may be used: logistic regression, naive Bayes, support vector machines, deep neural networks, random forest, decision tree, gradient-boosted tree, multilayer perceptron, and one-vs-rest. In an embodiment, an ensemble machine learning technique may be employed that uses multiple machine learning algorithms together to assure better prediction when compared with the prediction of a single machine learning algorithm. In this embodiment, training data for the model may include prior unusual I/O activity or system events in this or any other continuous data protection environment. This training data may be labeled as either useful or not, which may be used to assist in predicting whether or not data at new restore points may be useful in recovering from a current issue in the continuous data protection environment. The classification results may be stored in a database so that the data may be most current, and the output would always be up to date.

Efficiency in restoring data within the continuous data environment may be of paramount importance, such that it may be more important to restore data quickly than whether the specific data at a restore point is useful. As such, the time needed to load a restore point onto a node in the environment may be considered, along with a "replay time", or the time needed to load the difference in data from a previously loaded restore point to a desired restore point. In other words, it may be more efficient to only load the data into the node that is different from a restore point that is already loaded on a node rather then loading a stored restore point completely onto the node. As a result, the restore time for an interesting restore point may be an alternate criterion for identifying interesting restore points, and for grouping the interesting restore points, as discussed below.

At 206, the interesting restore points that have been identified may be grouped according to multiple considerations. First, the restore points may be prioritized or ranked by the confidence score that may be associated with the restore point as a result of the usefulness prediction. This ranking or prioritization may allow restore points with the highest confidence scores to be restored prior to those with lower confidence scores, as the grouping at this step may be done in order of importance and groups that may be formed at this step may be forwarded to nodes for loading and validation in the order that they are formed and with consideration for the importance of recovering the nodes in the continuous data protection environment as efficiently as possible. While the first consideration may be the usefulness measure, i.e., the confidence score of the prediction, the process may also leverage previously loaded restore points by comparing the predicted time to load the restore point, representing a new restore, with the predicted time to replay the newer log entries since the previously loaded checkpoint, or load the difference in data between the identified restore point and the data that may currently reside in a node that corresponds to a previously loaded restore point. This consideration of efficiency in loading restore points either as a full recovery or a partial recovery from a previously loaded restore point may also include considering resources within the continuous data protection environment. Restore points may be scheduled on multiple separate nodes that may have been allocated, or made available, by the environment to load and validate restore point data with the goal of avoiding skew, or spreading the resource load due to the loading of a restore point or the execution of a validation function across the available nodes. As a result, a restore point that the process may determine should be loaded on a specific node may be grouped at a different priority than the confidence score or the other considerations of efficiency may otherwise indicate.

At 208, the groups of restore points may be loaded on an available node. The scheduling may be performed by assigning the affinity of the restored volume and the corresponding container to a specific recovery node. Such assignment may cause the scheduler of the container platforms to honor the affinity and schedule a container on a given node for execution. One of ordinary skill in the art may recognize that, on container platforms, the affinity may bind or mount a restore point or a volume to a given node, such that when the recovery is started, i.e., the container is spawned, the scheduler may spawn the restore point or volume on that node and the restore point or volume may become accessible.

At 210, each restore point that has been scheduled may be validated. Upon completion of recovery of each restore point, a user provided validation function is launched. The validation function may consist of a sample workload or a script. The script can query an entire piece of data or a fraction of data from the restored volume and may verify its correctness, e.g., by comparing against previously calculated digests or performing a malware scan with known signatures. The output of the validation function may be used for identifying the recovery points for the next round.

One of ordinary skill in the art may recognize that while the steps in the process may be presented as being performed serially, i.e., one after another, this is not required and, in fact, selection of restore points, as well as loading and validation of restore points, may overlap in time with one another such that the steps may be performed in parallel to further increase efficiency in recovering the continuous data protection environment and reduce wasted recovery attempts. It should also be noted that, in addition to parallel processing, the process 200 may also be iterative, such that while there may only be enough available nodes to process a certain number of restore point groups, the next-highest ranked group may be prepared to run through the same process, perhaps in parallel with the first group. Each run through the process may be a "round", such that if one round does not produce any viable restore points for use in the continuous data protection environment, the next round may be started, even if the last round has not completed. If, subsequent to starting the next round, a viable restore point is found, then all activity may be aborted and the viable restore point loaded onto the nodes to begin immediate recovery of the environment. Specific examples of these characteristics are that as soon as the recovery of interesting restore points is triggered, the fine-grained I/O characteristic learning process may be launched. This process may explore the I/O characteristics, as described above, in the time range near the prior restore points at a finer granularity to select the next set of restore points, thus improving the precision of recovery. Next, as the recovery of the restore point from the previous round completes, the recovery of one of the newly selected restore points may be launched, which may allow the search to continue while waiting for the results of validation functions and as those results become available. As the output of the validation functions becomes available, the results may be used to identify the salient I/O event characteristics or time ranges to be explored further. From the results of the validation function (e.g., 2 out of 5 restore points are valid), the next time-range and a set of interesting restore points in that time-range may be restored in the next round. This process may continue until user finds the desired restore point.

At 212, which may be reached if the data corresponding to the restore point is found to be valid, then the process may end due to a restore point having been found that is both useful and contains valid data that may be loaded on the nodes of the continuous data protection environment. In such an instance, all further selection, grouping, loading and validation operations may be aborted to avoid wasting further resources on these operations. In addition, the validated restore point may be marked or labeled in the log of the continuous data protection environment as being a known good restore point that may be quickly referenced either to directly restore data in the event of further corruption or other unusual system activity, or to use as a starting point for recovering data in the replay scenario described above, where only a difference of data is restored from a known good starting point. The confidence score that may be associated with the restore point may be modified in this step to reflect its use in the recovery process and both the restore point and its accompanying label that may be applied may also be used as training data for the machine learning model that is described in an embodiment of 204 for identifying interesting restore points.

At 214, which may be reached if the data corresponding to the restore point is found to not be valid, the process may discard the restore point and remove the restore point from further consideration in the current selection process or any future selection process. This may include modifying the confidence score that may be associated with the restore point to ensure that the restore point is not prioritized for recovery and resources are not used to load or validate the restore point. A discarded restore point may also be used as training data for the machine learning model that is described in an embodiment of 204 for identifying interesting restore points.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
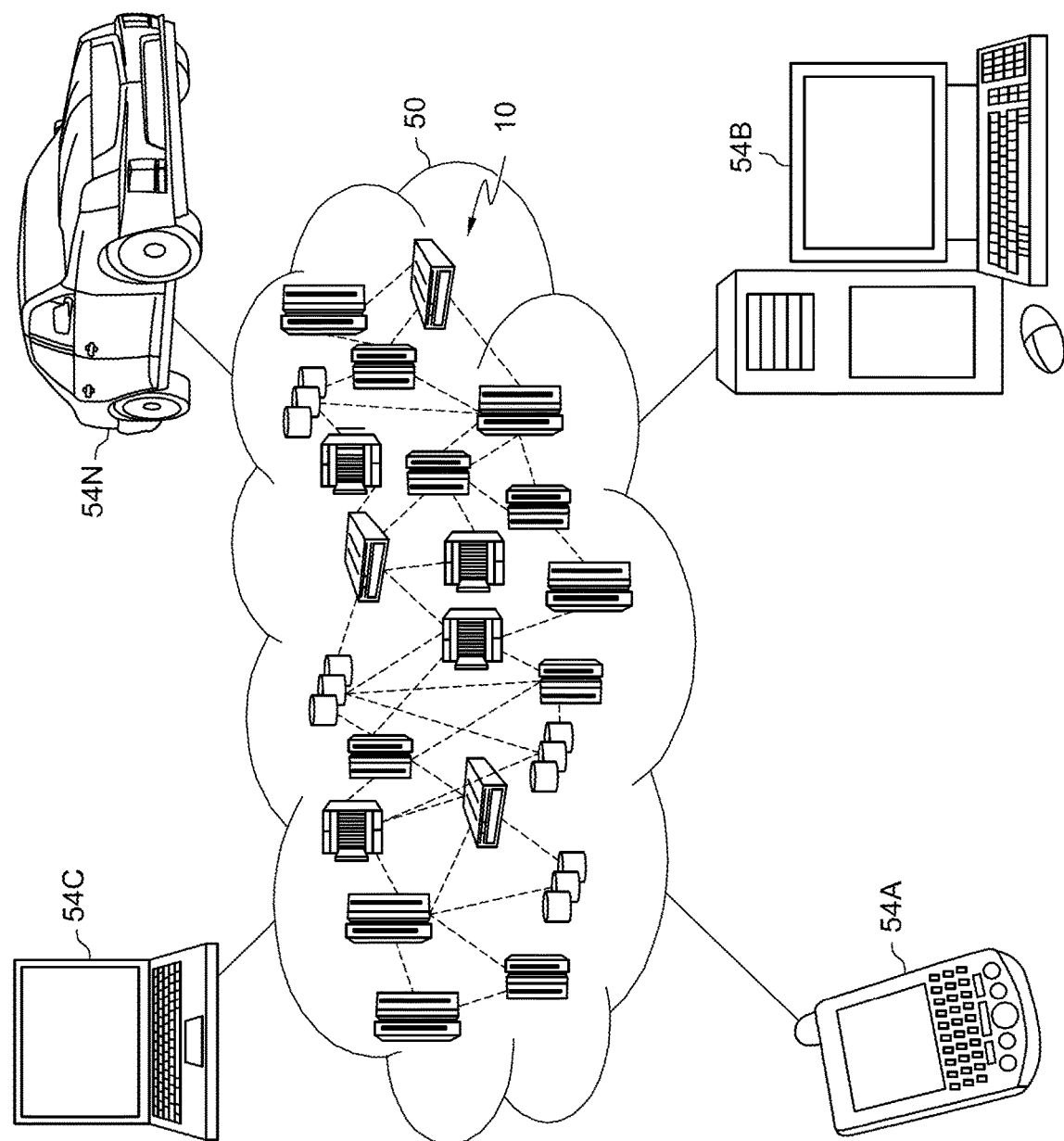
FIG. 3 depicts a cloud computing environment according to an embodiment.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
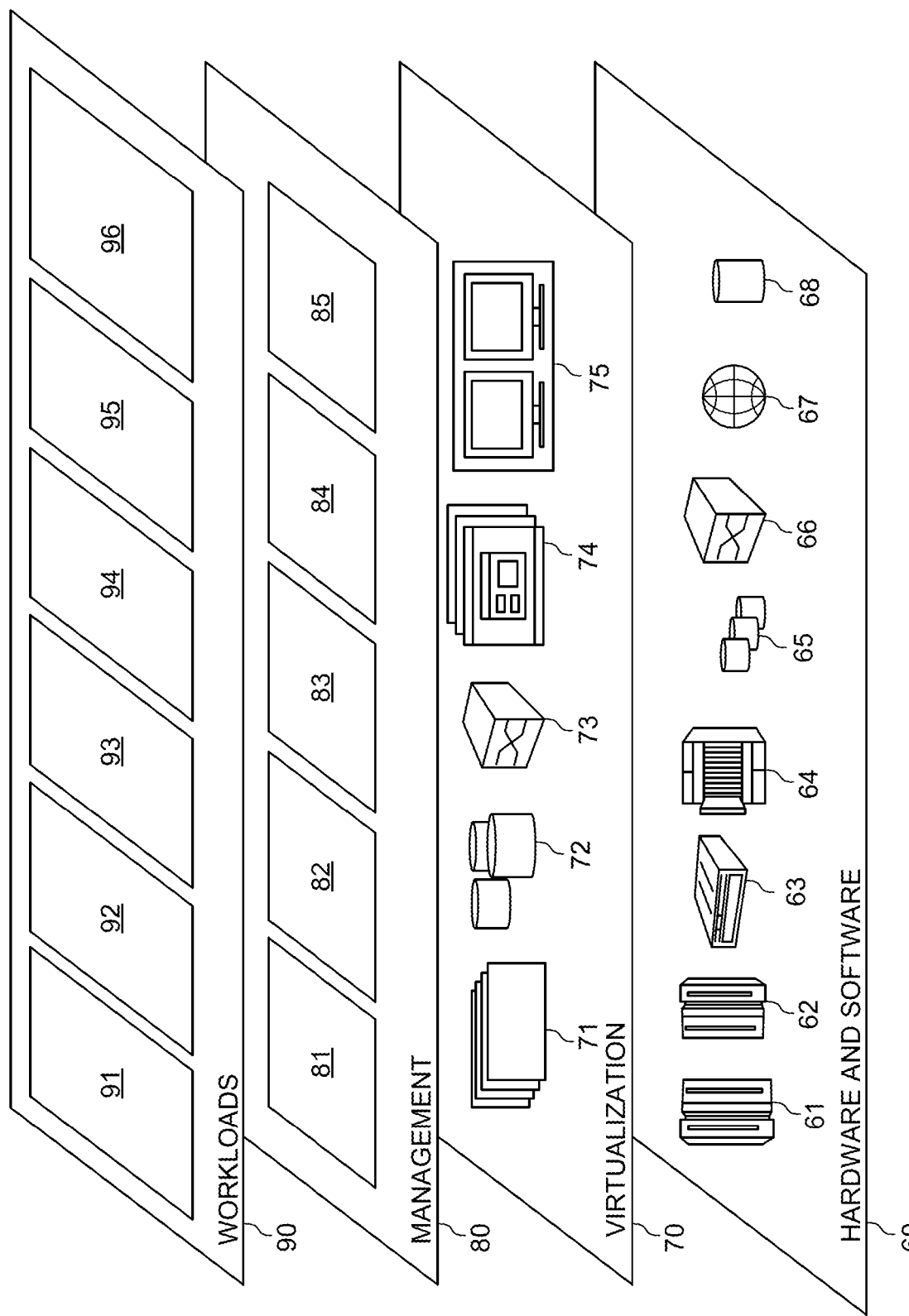
FIG. 4 depicts abstraction model layers according to an embodiment.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66, such as a load balancer. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and selecting restore points for data recovery 96. Selecting restore points for data recovery may refer to efficiently selecting restore points in a continuous data protection environment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for efficiently selecting restore points in a continuous data protection environment, the method comprising:
receiving a plurality of log entries from the continuous data protection environment, wherein the plurality of log entries includes a plurality of restore points that correspond to data stored in the continuous data protection environment, wherein the continuous data protection environment comprises a plurality of nodes;
determining a time window in the plurality of log entries, wherein the time window is immediately prior to a deviation of an I/O parameter of a node outside of a range, and identifying interesting restore points that occur in the time window;
grouping the interesting restore points based on one or more of a confidence score associated with each interesting restore point and a restore time;
loading an interesting restore point in a group of interesting restore points on an available node in the plurality of nodes;
determining that the data corresponding to the interesting restore point is valid using a validation function on the available node; and
loading the interesting restore point into the plurality of nodes of the continuous data protection environment.

2. The computer-implemented method of claim 1, further comprising:
determining that the data corresponding to the interesting restore point is not valid; and
modifying the confidence score associated with the interesting restore point.

3. The computer-implemented method of claim 1, further comprising:
determining that the data corresponding to the interesting restore point is not valid; and
discarding the interesting restore point.

4. The computer-implemented method of claim 1, further comprising labeling the interesting restore point in the plurality of log entries of the continuous data protection environment.

5. The computer-implemented method of claim 1, wherein a machine learning model that predicts usefulness of data corresponding to a restore point based on a proximity in time prior to unusual I/O activity is used to identify the interesting restore point in the plurality of log entries.

6. The computer-implemented method of claim 1, wherein the restore time is determined by comparing a load time, wherein the load time indicates a first time to load the data corresponding to the interesting restore point on a subject node, and a replay time, wherein the replay time indicates a second time to load a difference between existing data on the subject node and the data corresponding to the interesting restore point.

7. The computer-implemented method of claim 1, wherein each interesting restore point in the group of interesting restore points is loaded on a distinct available node.

8. A computer system for efficiently selecting restore points in a continuous data protection environment, the computer system comprising:
one or more processors, one or more computer-readable memories, one or more computer-readable storage media, and program instructions stored on at least one of the one or more computer-readable storage media for execution by at least one of the one or more processors via at least one of the one or more computer-readable memories, wherein the computer system is capable of performing a method comprising:
receiving a plurality of log entries from the continuous data protection environment, wherein the plurality of log entries includes a plurality of restore points that correspond to data stored in the continuous data protection environment, wherein the continuous data protection environment comprises a plurality of nodes;
determining a time window in the plurality of log entries, wherein the time window is immediately prior to a deviation of an I/O parameter of a node outside of a range, and identifying interesting restore points that occur in the time window;
grouping the interesting restore points based on one or more of a confidence score associated with each interesting restore point and a restore time;
loading an interesting restore point in a group of interesting restore points on an available node in the plurality of nodes;
determining that the data corresponding to the interesting restore point is valid using a validation function on the available node; and
loading the interesting restore point into the plurality of nodes of the continuous data protection environment.

9. The computer system of claim 8, further comprising:
determining that the data corresponding to the interesting restore point is not valid; and
modifying the confidence score associated with the interesting restore point.

10. The computer system of claim 8, further comprising:
determining that the data corresponding to the interesting restore point is not valid; and
discarding the interesting restore point.

11. The computer system of claim 8, further comprising labeling the interesting restore point in the plurality of log entries of the continuous data protection environment.

12. The computer system of claim 8, wherein a machine learning model that predicts usefulness of data corresponding to a restore point based on a proximity in time prior to unusual I/O activity is used to identify the interesting restore point in the plurality of log entries.

13. The computer system of claim 8, wherein the restore time is determined by comparing a load time, wherein the load time indicates a first time to load the data corresponding to the interesting restore point on a subject node, and a replay time, wherein the replay time indicates a second time to load a difference between existing data on the subject node and the data corresponding to the interesting restore point.

14. The computer system of claim 8, wherein each interesting restore point in the group of interesting restore points is loaded on a distinct available node.

15. A computer program product for efficiently selecting restore points in a continuous data protection environment, the computer program product comprising:
a computer-readable storage medium storing computer-readable program code embodied therewith, the computer-readable program code comprising program code executable by a computer to perform a method comprising:
receiving a plurality of log entries from the continuous data protection environment, wherein the plurality of log entries includes a plurality of restore points that correspond to data stored in the continuous data protection environment, wherein the continuous data protection environment comprises a plurality of nodes;

determining a time window in the plurality of log entries, wherein the time window is immediately prior to a deviation of an I/O parameter of a node outside of a range, and identifying interesting restore points that occur in the time window;

grouping the interesting restore points based on one or more of a confidence score associated with each interesting restore point and a restore time;

loading an interesting restore point in a group of interesting restore points on an available node in the plurality of nodes;

determining that the data corresponding to the interesting restore point is valid using a validation function on the available node; and loading the interesting restore point into the plurality of nodes of the continuous data protection environment.

16. The computer program product of claim 15, further comprising:

determining that the data corresponding to the interesting restore point is not valid; and modifying the confidence score associated with the interesting restore point.

17. The computer program product of claim 15, further comprising:

determining that the data corresponding to the interesting restore point is not valid; and discarding the interesting restore point.

18. The computer program product of claim 15, further comprising labeling the interesting restore point in the plurality of log entries of the continuous data protection environment.

19. The computer program product of claim 15, wherein a machine learning model that predicts usefulness of data corresponding to a restore point based on a proximity in time prior to unusual I/O activity is used to identify the interesting restore point in the plurality of log entries.

20. The computer program product of claim 15, wherein the restore time is determined by comparing a load time, wherein the load time indicates a first time to load the data corresponding to the interesting restore point on a subject node, and a replay time, wherein the replay time indicates a second time to load a difference between existing data on the subject node and the data corresponding to the interesting restore point.

* * * * *